US009438489B2

United States Patent
Beyene

(10) Patent No.: US 9,438,489 B2
(45) Date of Patent: Sep. 6, 2016

(54) COMPUTING A PERFORMANCE CHARACTERISTIC OF A NETWORK DEVICE

(75) Inventor: Yordanos Beyene, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 264 days.

(21) Appl. No.: 14/003,883

(22) PCT Filed: Apr. 19, 2011

(86) PCT No.: PCT/US2011/032972
§ 371 (c)(1),
(2), (4) Date: Sep. 9, 2013

(87) PCT Pub. No.: WO2012/144987
PCT Pub. Date: Oct. 26, 2012

(65) Prior Publication Data
US 2013/0346603 A1    Dec. 26, 2013

(51) Int. Cl.
*H04L 12/26* (2006.01)
*H04L 12/24* (2006.01)

(52) U.S. Cl.
CPC ............. *H04L 43/04* (2013.01); *H04L 41/145* (2013.01); *H04L 41/147* (2013.01)

(58) Field of Classification Search
CPC .... H04L 43/04; H04L 41/145; H04L 41/147
See application file for complete search history.

(56) References Cited

U.S. PATENT DOCUMENTS

| 6,909,700 | B1 | 6/2005 | Benmohamed et al. | |
| 7,076,393 | B2 | 7/2006 | Ormazabal et al. | |
| 7,302,482 | B2 | 11/2007 | Rodosek et al. | |
| 7,853,996 | B1 | 12/2010 | Ormazabal | |
| 2005/0060428 | A1* | 3/2005 | Corl et al. | 709/240 |
| 2006/0182034 | A1* | 8/2006 | Klinker | H04L 12/2602 370/238 |
| 2007/0180106 | A1 | 8/2007 | Pirzada et al. | |
| 2008/0155537 | A1 | 6/2008 | Dinda et al. | |
| 2009/0172800 | A1 | 7/2009 | Wool | |
| 2009/0222924 | A1* | 9/2009 | Droz et al. | 726/24 |
| 2009/0285102 | A1 | 11/2009 | Daily | |
| 2010/0296402 | A1 | 11/2010 | Fraccalvieri et al. | |
| 2011/0167491 | A1* | 7/2011 | Ruggerio | 726/23 |

FOREIGN PATENT DOCUMENTS

EP    2254286 A1    11/2010
WO    WO-2012144987 A1    10/2012

OTHER PUBLICATIONS

Miercom, Oct. 2009. "Cisco Integrated Services Routers Generation 2" Retrieved on Jul. 25, 2015 from <http://www.miercom.com/pdf/reports/20091001.pdf>.*

(Continued)

*Primary Examiner* — Dustin Nguyen
*Assistant Examiner* — Juan C Turriate Gastulo
(74) *Attorney, Agent, or Firm* — Hewlett Packard Enterprise Patent Department

(57) ABSTRACT

A traffic profile or description of a mix of different types of traffic is provided to compute, using a model, a performance characteristic of a network device. The model relates a performance characteristic of the network device to parameters associated with different types of traffic.

15 Claims, 3 Drawing Sheets

(56) References Cited

OTHER PUBLICATIONS

Cisco, 2008. "Network Based Application Recognition Performance Analysis" Retrieved on Jul. 25, 2015 from <http://www.cisco.com/en/US/technologies/tk543/tk759/technologies_white_paper0900aecd8031b712.pdf.*
International Preliminary Report on Patentability, Oct. 31, 2013, PCT Application No. PCT/US2011/032972.
Acharya et al., Traffic-Aware Firewall Optimization Strategies, Jun. 2006 (6 pages).
Agilent Technologies, White Paper, Evaluating Application-aware Firewall Performance, 2004 (16 pages).
Bradner, Network Working Group, Benchmarking Methodology for Network Interconnect Devices, RFC 2544, Mar. 1999 (29 pages).
Bradner, Network Working Group, Benchmarking Terminology for Network Interconnection Devices, RFC 1242, Jul. 1991 (11 pages).
Cohen et al., Packet Classification in Large ISPs: Design and Evaluation of Decision Tree Classifiers, 2005 (16 pages).
Fulp et al., A Function-Parallel Architecture for High-Speed Firewalls dated on or before 2006 (6 pages).
Hamed et al., Dynamic Rule-ordering Optimization for High-speed Firewall Filtering, ASIACCS 2006 (11 pages).
Harris et al., Performance Analysis of the Linux Firewall in a Host, Jun. 12, 2002 (11 pages).
http://rootsecurity.org—An Introduction to Network Firewalls and the Firewall Selection Process, Dec. 2008 (7 pages).
International Search Report and Written Opinion, Feb. 8, 2012, PCT Application No. PCT/US2011/032972.
Juniper Networks, White Paper, Comparison of Firewall, Intrusion Prevention and Antivirus Technologies, 2004 (8 pages).
Mandeville, RFC 2285—Benchmarking Terminology for LAN Switching Devices, Feb. 1998 (26 pages).
McCreary et al, CAIDA, Trends in Wide Area IP Traffic Patterns dated on or before Apr. 2011 (25 pages).
R. Caceres, Measurements of Wide Area Internet Traffic, dated on or before 2007 (18 pages).
SANS Institute, InfoSec Reading Room, Comparison Shopping for Scalable Firewall Products, 2001 (11 pages).
Wolf et al., Predictive Scheduling of Network Processors dated on or before 2002 (23 pages).
Xu et al., Design and Evaluation of a High-Performance ATM Firewall Switch and Its Applications, 1999 IEEE (11 pages).
European Patent Office, Extended European Search Report for 11863793.3 dated Jan. 26, 2015 (7 pages).
Noureldien et al., Abstract only, A Stateful Inspection Module Architecture, Sep. 2000 (2 pages).

* cited by examiner

COMPUTING A PERFORMANCE CHARACTERISTIC OF A NETWORK DEVICE

CROSS-REFERENCE TO RELATED APPLICATION

This application is a U.S. National Stage Application of and claims priority to International Patent Application No. PCT/US2011/032972, filed on Apr. 19, 2011, and entitled "COMPUTING A PERFORMANCE CHARACTERISTIC OF A NETWORK DEVICE".

BACKGROUND

Various types of network devices can be deployed in a network to allow communications between electronic devices, which can include computers, personal digital assistants, mobile telephones, or other types of devices. Examples of network devices include firewalls, proxies, gateways, network address translators, and any other type of device through which communication between at least two electronic devices can pass. A network device is associated with certain performance characteristics (such as a data throughput, number of packets over a specified time interval, etc.) that determine the processing capabilities of the network devices when handling traffic communicated in a network.

BRIEF DESCRIPTION OF THE DRAWINGS

Some embodiments are described with respect to the following figures.

DETAILED DESCRIPTION

A network device that can be deployed in a network for processing traffic communicated in the network is associated with respective performance characteristics. Examples of performance characteristics include a number of packets that can be handled by the network device within a time interval, data throughput (which represents a number of bytes that can be handled by the network device within a time interval), or other performance characteristics. One type of a network device is a security network device used to provide security in networks. For example, a security network device can include a firewall, which protects a network from unauthorized intrusion by entities outside the network. Other types of security network devices include network devices that implement network address translation, malware scanning, data encryption/decryption, security association establishment, and so forth.

Examples of other types of network devices include routers, switches, proxies, gateways, or any other network device deployed for communicating traffic between other electronic devices.

A performance characteristic of a network device can be advertised as a maximum number (e.g. the maximum data throughput of the network device) or a typical number (e.g. an average data throughput). Often, the performance characteristics of a network device advertised by a vendor or other marketer may be derived or measured under network traffic conditions that may not reflect actual network traffic conditions under which the network device is to be used. An actual traffic mix (mix of different types of traffic) that is to be processed by the network device upon deployment can be quite different from the traffic mix used to derive or measure performance characteristics for the network device, either by a vendor or other marketer, or by an independent third party.

If advertised performance characteristics of a network device do not accurately describe actual performance of the network device in an environment in which the network device is to be deployed, then the network device may not perform in an expected manner. For example, if the advertised performance characteristics of the network device are overly optimistic (for a given network deployment), then network communication performance can suffer if the deployed network device is unable to handle actual network traffic loading. On the other hand, if the advertised performance characteristics are overly pessimistic (for a given network deployment), then a network operator may over-provision the network by including a higher capacity network device or a larger number network devices than have to be provided.

Figure 1:
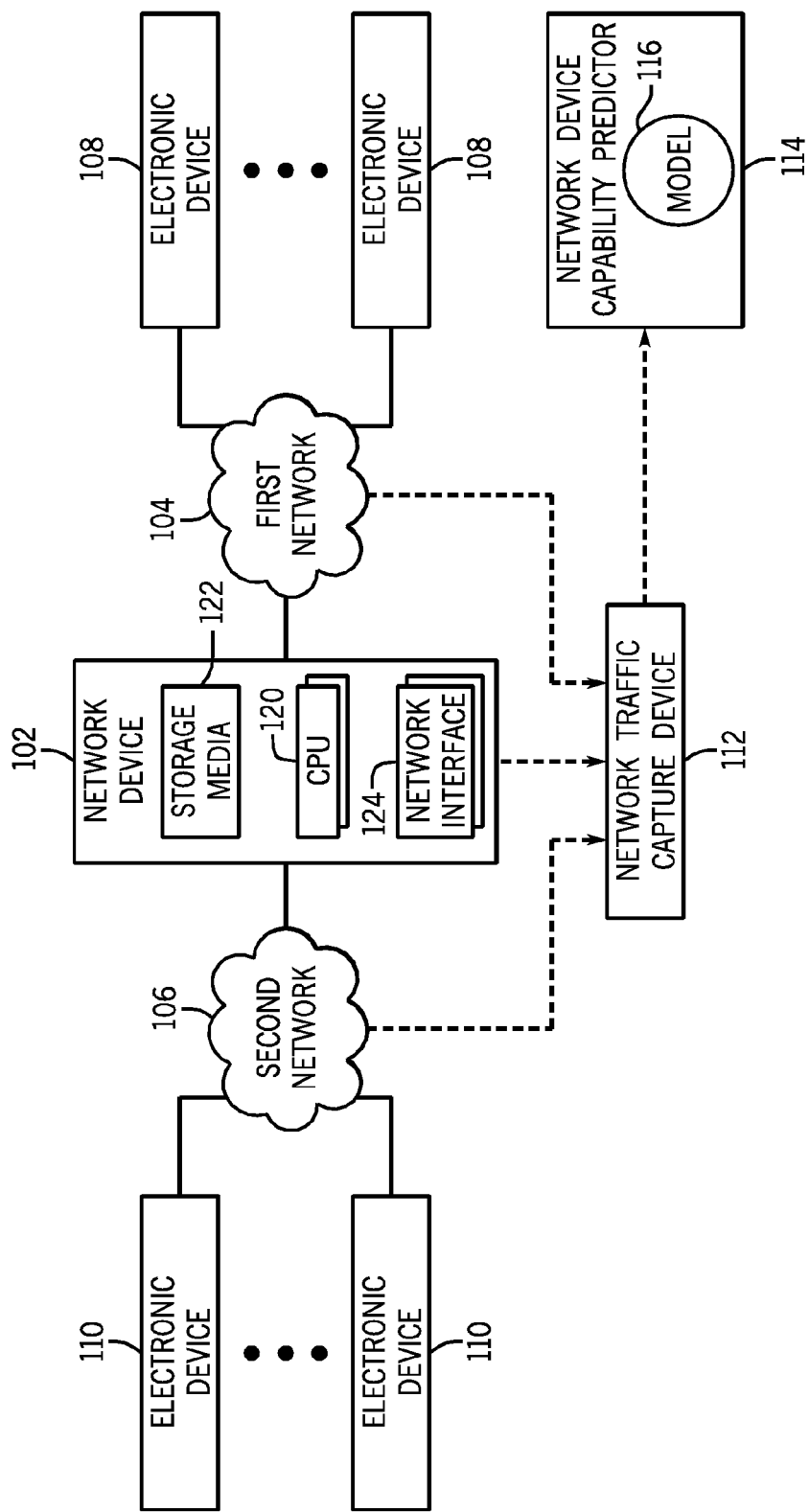
FIG. 1 is a block diagram of an example arrangement that includes various devices and a network device capability predictor, according to some implementations.

FIG. 1 depicts an example network arrangement that includes a network device 102 that is connected to first and second networks 104 and 106. The first network 104 is connected to various electronic devices 108, and the second network 106 is connected to various electronic devices 110. Examples of the electronic devices include computers, personal digital assistants (PDAs), mobile telephones, and so forth. The various electronic devices 108 and 110 can communicate with each other through the network device 102.

In some examples, the first network 104 can be a private network, such as the network of an enterprise (e.g. company, educational organization, government agency, etc.), a home network, or other type of private network. The second network 106 can be a public network, such as the Internet. Although just one network device 102 is shown in FIG. 1, it is noted that in alternative examples, there can be multiple network devices in a network arrangement.

Various different types of traffic that can be communicated through the network device 102. As examples, the different types of network traffic can include traffic according to different types of protocols. Protocols can refer to transport protocols, such as the Transmission Control Protocol (TCP) or User Datagram Protocol (UDP). A version of TCP is described in RFC (Request for Comments) 793, entitled "Transmission Control Protocol," dated September 1981. A version of UDP is described in RFC 768, entitled "User Datagram Protocol," dated August 1980. A transport protocol defines communications at a transport layer of a multi-layered architecture, where the transport layer provides for end-to-end communications services for applications in electronic devices.

In other examples, the different types of traffic that can be communicated through the network device 102 can be according to other types of protocols, such as protocols at the application level. Examples of different application-level protocols include FTP (File Transfer Protocol), RTP (Real-Time Protocol), HTTP (Hypertext Transfer Protocol), DNS (Domain Name System) protocol, and/or other types of application-level protocols. In some examples, web browsing traffic or electronic mail traffic can be according to HTTP, file transfer traffic can be according to FTP, voice-over-IP (Internet Protocol) traffic or video conferencing traffic can be according to RTP, and control traffic can be according to DNS (e.g. a control message to look up an IP address associated with a domain name, for example) or some other control protocol.

Although the ensuing discussion refers to different types of traffic according to various different protocols, note that traffic can be distinguished according to other classes or categories. For example, traffic can be categorized into voice traffic, video traffic, data traffic, control traffic, and so forth.

As farther shown in FIG. 1, in some examples, a network traffic capture device 112 can be deployed in the network arrangement to capture a sample of the traffic that passes through the network device 102 during use of the network device 102. Although the network traffic capture device 112 is shown as being separate from the network device 102, it is noted that in alternative examples, the network traffic capture device 112 can be implemented as a module within the network device 102, or within another network device in the network shown in FIG. 1.

The traffic sample that can be captured by the network traffic capture device 112 can be provided in the form of a network trace. A "network trace" includes a collection of network packets communicated over time. The traffic sample can be a sample collected over some predefined time interval, such as a day, a week, a month, or other time interval.

The network trace captured by the network traffic capture device 112 is provided to a network device capability predictor 114 in accordance with some implementations. The network device capability predictor 114 can be implemented in any type of a computing node, which can be separate from the network device 102 and the electronic devices 108 and 110. Alternatively, the computing node including the network device capability predictor 114 can be part of one of the network device 102 or electronic devices 108, 110.

In alternative implementations, instead of using the network traffic capture device 112 to capture a network trace that is provided to the network device capability predictor 114, other techniques of providing information describing network traffic can be used. For example, a network operator (or other user) can manually create a description of a traffic profile that is expected to be processed by the network device 102. This description can then be fed to the network device capability predictor 114.

More generally, traffic information is provided to the network device capability predictor 114, where the "traffic information" can refer to a network trace or any type of description of network traffic expected to be processed by a network device. In response to the traffic information, the network device capability predictor 114 uses a model 116 to compute at least one performance characteristic of the network device 102, where the model 116 relates parameters associated with different types of traffic to at least one performance characteristic of the network device 102.

Figure 2:
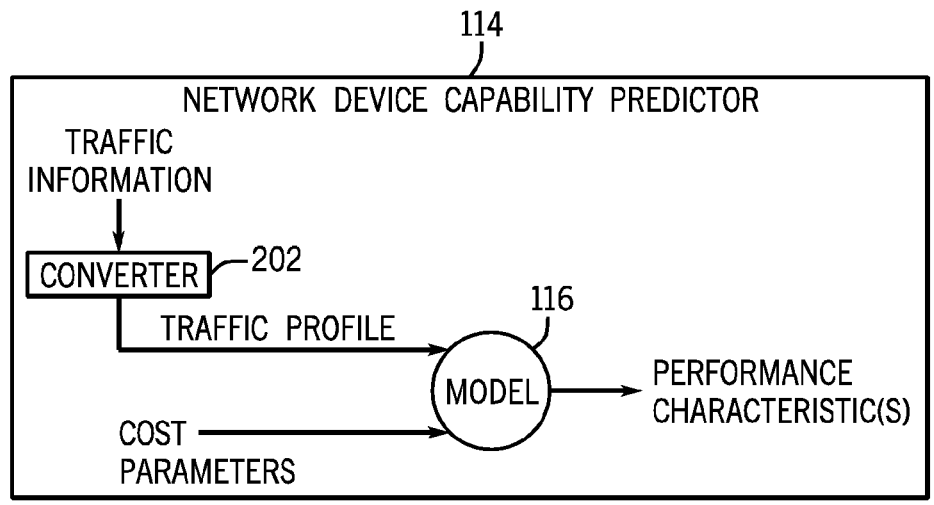
FIG. 2 is a schematic diagram of components in the network device capability predictor, according to some implementations.

As shown in FIG. 2, traffic information can be provided to a converter 202 in the network device capability predictor 114. The converter 202 converts the traffic information to a traffic profile. In some examples, the conversion performed by the converter 202 can include processing a network trace to compute respective percentages of different types of traffic (which are included in the traffic profile). Alternatively, the conversion performed by the converter 202 includes processing some other input description of network traffic to compute respective percentages of different types of traffic. In some other implementations, the traffic information that is input to the network device capability predictor 114 is already in the form of the traffic profile, in which case the converter 202 can be omitted. Generally, the traffic profile output by the converter 202 describes a mix of different traffic types (e.g. traffic according to different protocols).

As further shown in FIG. 2, the inputs to the model 116 include a traffic profile and cost parameters associated with the network device 102. The cost parameters specify costs (e.g. burden, utilization, etc.) relating to processing of respective different types of traffic by the network device 102. Based on the traffic profile and the cost parameters, the model 116 outputs at least one performance characteristic of the network device 102.

As further depicted in FIG. 1, the network device 102 has various components, including one or multiple central processing units (CPUs) 120, storage media 122 (e.g., one or multiple disk-based storage devices and/or memory devices), and network interfaces 124 to communicate over the first and second networks 104 and 106. In many cases, the performance of the network device 102 relating to processing of traffic is determined by the capacity of the CPU(s) 120. In other words, the CPU(s) 120 of the network device 102 is (are) typically the bottleneck of the network device. Thus, in some implementations, an understanding of performance characteristics of the network device 102 can be based on an understanding of utilization of the CPU(s) 120 caused by different types of traffic that are expected to be processed by the network device 102. CPU utilization is thus one example of a cost parameter—different CPU utilizations are specified for respective different types of traffic.

Although reference is made to ascertaining the performance characteristics of the network device 102 based on CPU utilizations associated with different traffic types in the ensuing discussion, note that in other implementations, performance characteristics of the network device 102 can be ascertained based on other types of cost parameters, whether associated with the CPU(s) 120 and/or other components of the network device 102, such as the storage media 122, network interfaces 124, or other components.

In some implementations, where the traffic profile describes a mix of TCP traffic (made up of TCP packets) and UDP traffic (made up of UDP packets), CPU utilizations can be specified for TCP packets and UDP packets. A stream of TCP packets includes a TCP SYN packet (which is used to establish a new TCP connection) and subsequent TCP packets following the TCP SYN packet (which can include other control packets or data packets that carry data payloads).

A stream of UDP packets includes a first UDP packet and subsequent UDP packets. A "stream" refers to the packets communicated in a given session, either a TCP session or UDP session.

Generally, CPU utilization associated with processing a first packet of a stream (e.g. TCP SYN packet in a TCP stream or first UDP packet of a UDP stream) is greater than CPU utilization associated with processing packets following the first packet. When the network device 102 receives the first packet of a stream, more processing is typically performed at the network device 102, since the network device 102 has to establish a new session in response to the first packet. In response to the first packet, the network device 102 first checks a session table (or other data structure) to determine if the first packet (first UDP packet or TCP SYN packet) is part of an existing session, and if not, the network device 102 checks the first packet against predefined rules implemented by the network device 102. For example, if the network device 102 is a firewall, then the rules are firewall rules, and the network device 102 checks the first packet against the firewall rules to determine whether or not creation of the session is allowed. Subsequent packets of the TCP or UDP stream can be checked against the session table (or other data structure) to confirm that such subsequent packets belong to an existing session. Consequently, processing of a first packet generally involves more processing tasks (and thus more processing overhead in terms of CPU utilization) than processing of subsequent packets.

Also, generally, TCP packets involve more processing overhead than UDP packets. Packet processing overhead also tends to be cumulative. In other words, the packet processing overhead imposed by a mix of two traffic profiles (e.g. a first traffic profile including TCP traffic only, and a second traffic profile including UDP traffic only) is the sum of the processing overhead of the individual traffic profiles (subject to negligible effects of other parameters such as a size of a cache used in the network device).

Cost parameters can be specified for the different types of packets, including the TCP SYN packet, subsequent TCP packet, first UDP packet, and subsequent UDP packet. For example, a first cost parameter (first CPU utilization $C_1$) can be specified for the TCP SYN packet, a second cost parameter (second CPU utilization $C_2$) can be specified for a subsequent TCP packet in a stream following the first TCP SYN packet, a third cost parameter (third CPU utilization $C_3$) can be specified for a first UDP packet, and a fourth cost parameter (fourth CPU utilization $C_4$) can be specified for a subsequent UDP packet in a stream following the first UDP packet.

The multiple cost parameters, $C_2$, $C_3$, and $C_4$, can be determined. experimentally (such as by measuring CPU utilizations in response to processing of test packets by the network device 102). Once determined, the cost parameters for a specific network device (or a specific type of network device) can be stored or subsequent use. The determination of $C_1$, $C_2$, $C_3$, and $C_4$ does not have to be repeated for each iteration of performance characteristic prediction for a given type of network device performed by the network device capability predictor 114. In fact, in many cases, the determination of $C_1$, $C_2$, $C_3$, and $C_4$ can be performed just once and the model 116 can be applied using such parameters.

In some implementations, it is assumed that packet size of traffic has negligible impact on performance characteristics of the network device 102, and that the number of active sessions of a network device also has negligible impact on performance characteristics of the network device. Also, in some implementations, it is assumed that the size of a set of rules in the network device also has a negligible impact on the performance characteristics of the network device. In other implementations, if packet size or number of active sessions or rule set size has an impact on a network device performance characteristic, then parameters can also be specified for packet size and/or number of active sessions and/or rule set size and provided as inputs (along with $C_1$, $C_2$, $C_3$, and $C_4$ and the traffic profile) to the model 116 for determining a performance characteristic of a network device.

Figure 3:
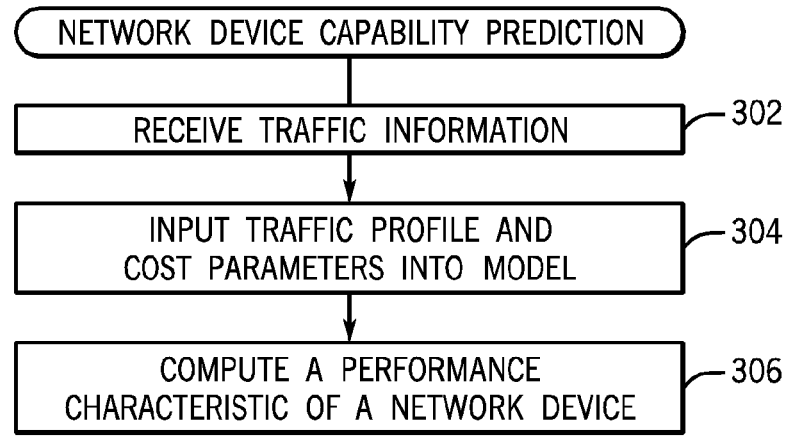
FIGS. 3 and 4 are flow diagrams of processes of a network device capability predictor, according to various implementations.

FIG. 3 is a flow diagram of a process according to some implementations that can be performed by the network device capability predictor 114 of FIG. 1. The network device capability predictor 114 receives (at 302) traffic information relating to network traffic that is expected to be processed by the network device 102.

The network device capability predictor 114 inputs (at 304) a traffic profile (that corresponds to the received traffic information) and various cost parameters (e.g. $C_1$, $C_2$, $C_3$, $C_3$, and $C_4$ discussed above) into the model 116.

The network device capability predictor 114 then computes (at 306), by using the model 116 based on the input traffic profile and cost parameters, at least one performance characteristic of the network device 102, where the at least one performance characteristic can include: a maximum number of packets that can be processed by the network device 102 (within a given time interval), a maximum data throughput of the network device 102 (which represents a maximum bytes that can be processed by the network device within a given time interval), or another performance characteristic.

The traffic information received at 302 in the process of FIG. 3 can include information relating to TCP and UDP packets, from which a traffic profile describing a mix of TCP and UDP packets can be easily ascertained. Alternatively, the received traffic information can include information relating to traffic of different application-level protocols.

In some implementations, a traffic profile can describe a mix of four types of traffic: TCP SYN packet, subsequent TCP packet (TCP packet following the TCP SYN packet in a stream), first UDP packet, and subsequent UDP packet (UDP packet following the first UDP packet in a stream).

Let $P_{type}$ (type=1, 2, 3, or 4) be the probability distribution of each of the foregoing four types of packets, and $C_{type}$ the corresponding CPU utilization of each of the four types of packets. The four $C_{type}$ values include $C_1$, $C_2$, $C_3$, and $C_4$. The value of $P_{type}$ is expressed as a percentage, and can be readily extracted from a traffic trace using traffic analysis tools, or can be derived from some other description of traffic information. The four values of $P_{type}$ include $P_1$, $P_2$, $P_3$, and $P_4$, where $P_1$ represents a percentage of the overall traffic that includes TCP SYN packets, $P_2$ represents a percentage of the overall traffic that includes subsequent TCP packets, $P_3$ represents a percentage of the overall traffic that includes first UDP packets, and $P_4$ represents a percentage of the overall traffic that includes subsequent UDP packets.

The CPU utilization (CPU_Utilization) for N number of packets is described as follows:

$$\text{CPU\_Utilization} = N \cdot \Sigma_{type} C_{type} \cdot P_{type}, \quad (\text{Eq. 1})$$

where type ranges from 1 to 4. The variable N is unknown, and represents the number of packets that can be processed by a network device in a given time interval (e.g. one second). Note that the CPU utilization parameters of Eq. 1 (including CPU_Utilization and $C_{type}$) represent utilizations measured during some time interval—consequently, the value of the variable N represents the number of packets that can be processed by the network device in such time interval. By rewriting Eq. 1 to solve for N the following Eq. 2 can be derived:

$$N = \text{CPU\_Utilization} / \Sigma_{type} C_{type} \cdot P_{type}. \quad (\text{Eq. 2})$$

The maximum number of packets that a network device can process occurs when the CPU(s) of the network device is (are) nearly fully utilized or fully utilized (when CPU_Utilization is at 100%). Therefore, the maximum total number of packets (N) per given time interval, and the maximum number of packets for each packet type ($N_{type}$) is computed as follows (where Eq. 3 is the same as Eq. 2, except that CPU_Utilization in Eq. 3 has been replaced with 1 to represent 100% utilization):

$$N = 1/\Sigma_{type} C_{type} \cdot P_{type}, \quad (Eq. 3)$$

$$N_{type} = N \cdot P_{type}, \quad (Eq. 4)$$

Given an average packet size (Size$_{type}$, type=1, 2, 3, 4) for each respective one of the four types of packets, the maximum throughput (T$_{put}$) in bytes per time interval can be expressed as follows:

$$T_{put} = \Sigma_{type}(\text{Size}_{type} \cdot N_{type}). \quad (Eq. 5)$$

Eqs. 1-5 above together represent the model 116 according to some implementations, where it is assumed that the traffic profile is expressed in terms of a mixture of TCP and UDP packets (including the four types discussed above).

In alternative implementations, traffic information received by the network device capability predictor 114 can be expressed as traffic according to various application-level protocols. For example, traffic information can be characterized using an application-level protocol mix as follows: $r_1$ (a percentage) HTTP traffic, $r_2$ (a percentage) DNS traffic, and $r_3$ percentage) FTP traffic. For example, $r_1$=80%, $r_2$=15%, and $r_3$=80%. The average packet sizes thr HTTP traffic, DNS traffic, and FTP traffic can be represented as size$_1$ (e.g. 512 bytes), size$_2$ (e.g. 68 bytes), and size$_3$ (e.g. 256 bytes), respectively. Also, the average numbers of HTTP packets, DNS packets, and FTP packets can be represented as $n_2$, and $n_3$, respectively.

More generally, $f_i$ (i=1 to c) represents the flows (according to corresponding different application-level protocols), where c is the number of different application-level protocols. In the example above that includes a mix of HTTP, DNS, and FTP traffic, the parameter c has value 3. In other examples, C can have other values. The parameter $n_i$ represents the average number of packets in flow $f_i$, and the parameter size$_i$ represents the average packet size in flow $f_i$. Also, $r_i$ represents the percentage (ratio) of flow $f_i$ in the overall traffic mix.

In addition to the foregoing parameters, let $u_i$ represent whether a flow $f_i$ contains UDP traffic, and let and $t_i$ represent whether a flow $f_i$ contains TCP traffic. For example, if $u_i$=1, then the flow $f_i$ contains UDP traffic, but if $u_i$=0, then the flow $f_i$ does not contain UDP traffic. Similarly, if $t_i$=1, then the flow $f_i$ contains TCP traffic, but if $t_i$=0, then the flow $f_i$ does not contain TCP traffic.

Traffic information based on the foregoing is thus expressed using the following parameters: size $f_i$, $n_i$, size$_i$, $r_i$, $u_i$, and $t_i$.

The network device capability predictor 114 can convert the foregoing traffic information into a traffic profile expressed in terms of a mixture of TCP and UDP packets (TCP SYN packets, subsequent TCP packets, first UDP packets, and subsequent UDP packets). Such conversion can be performed by the converter 202 of FIG. 2, for example. The probability distributions of the foregoing four types of TCP and UDP packets in each flow $f_i$ can be computed as follows:

$P_{(1,i)} = t_i \cdot r_i \cdot 1/n_i$ (percentage of TCP SYN packets in flow $f_i$);

$P_{(2,i)} = t_i \cdot r_i \cdot (n_i - 1)/n_i$ (percentage of subsequent TCP packets in flow $f_i$);

$P_{(3,i)} = u_i \cdot r_i \cdot 1/n_i$ (percentage of first UDP packets in flow $f_i$);

$P_{(4,i)} = u_i \cdot r_i \cdot (n_i - 1)/n_i$ (percentage of subsequent UDP packets in flow $f_i$), where $\Sigma_i \Sigma_{type}(P_{type,i})=1$ for type=1 to 4, and i=1 to c. The foregoing four percentages, $P_{(1,i)}$, $P_{(2,i)}$, and $P_{(3,i)}$, and $P_{(4,i)}$ are part of the traffic profile. Given the above, the CPU utilization (CPU_Utilization) for N number of packets is expressed as follows.

$$\text{CPU\_Utilization} = N \cdot (\Sigma_i \Sigma_{type}(P_{type,i} \cdot C_{type})), \quad (Eq. 6)$$

where i=1 to c, and type=1 to 4. N, the unknown parameter, can be derived from the above equation as follows:

$$N = \text{CPU\_Utilization}/(\Sigma_i \Sigma_{type}(P_{type,i} \cdot C_{type})) \quad (Eq. 7)$$

The variable N represents the maximum number of packets (within a predefined time interval) that can be processed when the CPU(s) of the network device is (are) fully utilized. Assuming this full utilization is achieved when CPU_Utilization is 100%, then the maximum number of packets (N) in a given time interval, and the maximum number of packets in the given time interval for each flow ($N_i$) is computed as follows:

$$N = 1/(\Sigma_i \Sigma_{type}(P_{type,i} \cdot C_{type})), \text{ and} \quad (Eq. 8)$$

$$N_i = N \cdot r_i. \quad (Eq. 9)$$

Given the average size (size$_i$) of packets in each flow $f_i$, the model can predict the maximum throughput (T$_{put}$) in bytes per time interval as follows:

$$T_{put} = \Sigma_i(\text{size}_i \cdot N_i), \quad (Eq. 10)$$

where i ranges from 1 to c.

According to further alternative implementations, the traffic information received by the network device capability predictor 114 can include session intensity information in addition to a description of a traffic mix of traffic of different application-level protocols traffic discussed above. Session intensity information refers to information describing a session establishment rate per flow (rate of establishing new sessions within each of the flows, such as HTTP flow, DNS flow, FTP flow, etc.). Such session establishment rate per flow is expressed as $s_i$, where i=1 to c (c represents the number of flows), By being provided with the session establishment rate for each flow, the performance characteristic (e.g. N or T$_{put}$) calculated above can be calculated for just the subsequent TCP or UDP packets (excluding the TCP SYN packets or first UDP packets). In this way, the performance characteristic computed by the network device capability predictor 114 can provide a more realistic characterization of the network device, which can handle a relatively large number of concurrent sessions for each flow, Since the session establishment rate ($s_i$) is provided, Eq. 6 above can be rewritten as:

$$\text{CPU\_Utilization} = C_1 \cdot \sum_i (s_i \cdot t_i) + \quad (Eq. 11)$$
$$N \cdot C_2 \cdot \sum_i t_i \cdot r_i + C_3 \cdot \sum_i (s_i \cdot u_i) + N \cdot C_4 \cdot \sum_i u_i \cdot r_i,$$

where the various parameters in Eq. 11 except for $s_i$ are the same as discussed further above. Using Eq. 11, the network device capability predictor 114 can solve for N where N in this case does not include TCP SYN packets and first UDP packets, as in Eq. 6. Rather, N calculated according to Eq, 11 represents the maximum number of packets (subsequent TCP packets and/or subsequent UDP packets) that can be handled by the network device 102 within a time interval.

Figure 4:
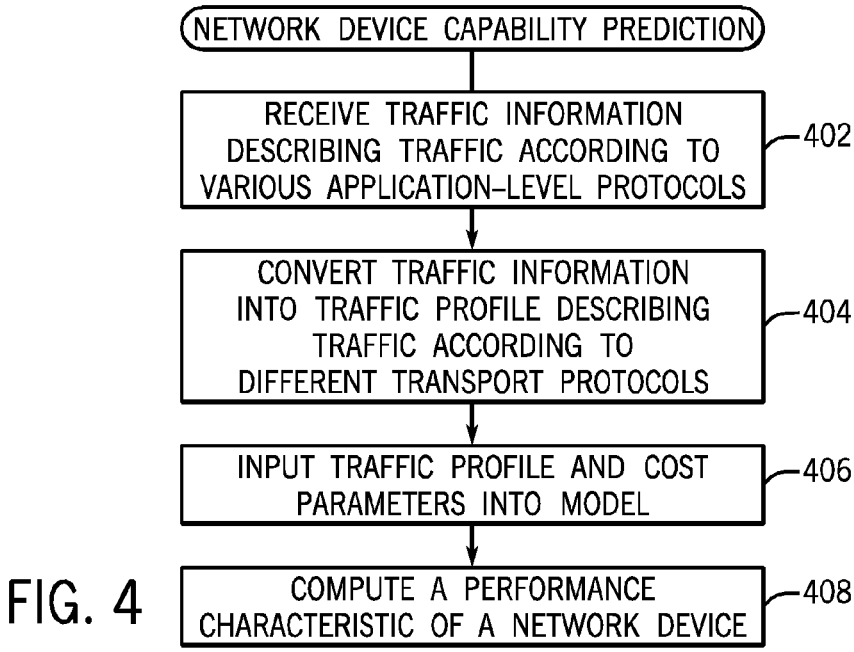

FIG. 4 is a flow diagram of a process performed by the network device capability predictor 114 according to alternative implementations. The network device capability predictor 114 receives (at 402) traffic information that describes traffic according to various application-level protocols (e.g. HTTP protocol, DNS protocol, RTP protocol, DNS protocol, etc.). The network device capability predictor 114 converts (at 404) the traffic information into a traffic profile that describes a mixture of different packets according to different transport protocols (e.g. TCP and UDP).

Similar to respective tasks 304 and 306 of FIG. 3, the traffic profile and cost parameters are input (at 406) into the model 116, and the network device capability predictor 114 computes (at 408) at least one performance characteristic of the network device using the model 116.

Figure 5:
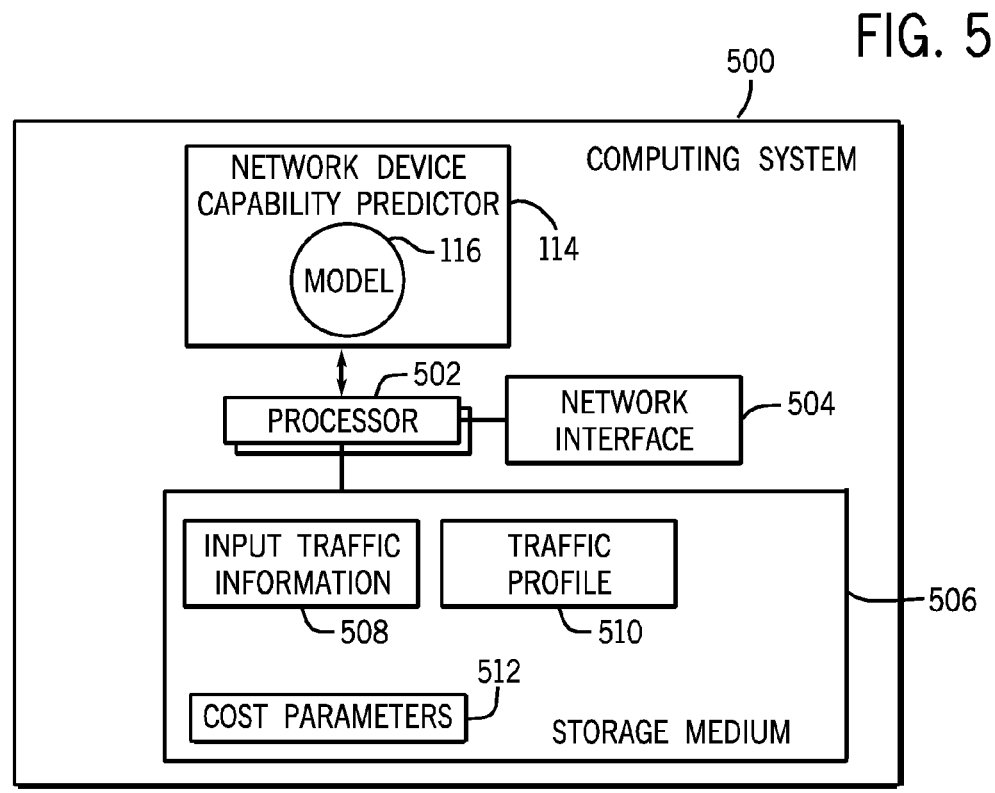
FIG. 5 is a block diagram of an example computing system in which a network device capability predictor can be executed, according to some implementations.

FIG. 5 depicts a computing system 500 in which the network device capability predictor 114 can be implemented. In examples according to FIG. 5, the network device capability predictor 114 is implemented with machine-readable instructions executable on one or multiple processors 502. In other examples, the network device capability predictor 114 can be implemented as a hardware device.

The processor(s) 502 is (are) connected to a network interface 504 (to allow the computing system 500 to communicate over a network with other devices) and to a storage medium 506 (implemented with one or multiple disk-based storage devices and/or memory devices). The storage medium 506 can store input traffic information 508, a traffic profile 510, cost parameters 512, and a model 116, which are used by the network device capability predictor 114 as discussed above.

Each processor 502 can include a microprocessor, microcontroller, processor module or subsystem, programmable integrated circuit, programmable gate array, or another control or computing device.

Machine-readable instructions (such as the network device capability predictor 114 and its model 116) can be stored in the storage medium 506, which can include a computer-readable or machine-readable storage medium. The storage medium 506 can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of characterizing a network device, comprising:
   receiving, by a system having a processor, traffic information, wherein the traffic information describes a mix of traffic according to different application-level protocols, wherein the traffic information comprises information relating to a plurality of flows, each respective flow of the plurality of flows corresponding to a respective application-level protocol of the different application-level protocols;
   converting, by the system, the traffic information to a traffic profile that describes traffic according to a transport protocol;
   inputting, by the system, the traffic profile corresponding to the traffic information into a model stored in a non-transitory storage medium, wherein the model relates a performance characteristic of the network device to parameters associated with different types of traffic; and
   computing, from the model in response to the input traffic profile, the performance characteristic of the network device.

2. The method of claim 1, wherein inputting the traffic profile into the model comprises inputting the traffic profile into the model that relates the performance characteristic of the network device to cost parameters associated with traffic according to different transport protocols.

3. The method of claim 1, wherein receiving the traffic information comprises receiving a trace of actual traffic in a network in which the network device is to be deployed.

4. The method of claim 1, wherein computing the performance characteristic of the network device comprises computing a performance characteristic relating to an amount of data that can be processed by the network device.

5. The method of claim 1, wherein computing the performance characteristic of the network device comprises computing performance characteristics relating to amounts of respective different types of data that can be processed by the network device.

6. A system comprising:
   a non-transitory storage medium to store a model that relates a performance characteristic of a network device to parameters associated with different types of traffic;
   at least one processor to:
      receive traffic information that describes a mix of traffic according to different application-level protocols, wherein the traffic information comprises information relating to a plurality of flows, each respective flow of the plurality of flows corresponding to a respective application-level protocol of the different application-level protocols;
      convert the traffic information to a traffic profile that describes traffic according to a transport protocol;
      input the traffic profile into the model; and
      compute a performance characteristic of the network device using the model in response to the input traffic profile, wherein the model outputs a value for the performance characteristic in response to parameters associated with the different types of traffic.

7. The system of claim 6, wherein the traffic profile describes traffic according to different transport protocols, the different transport protocols comprise a Transmission Control Protocol and a User Datagram Protocol, and wherein the parameters comprise a first parameter associated with traffic of the Transmission Control Protocol, and a second parameter associated with traffic of the User Datagram Protocol.

8. An article comprising at least one non-transitory machine-readable storage medium storing instructions that upon execution cause a system having a processor to:
  receive traffic information that describes a mix of traffic according to different application-level protocols, wherein the traffic information comprises information relating to a plurality of flows, each respective flow of the plurality of flows corresponding to a respective application-level protocol of the different application-level protocols;
  convert the traffic information to a traffic profile that describes traffic according to a transport protocol;
  input the traffic profile corresponding to the traffic information into a model stored in a non-transitory storage medium, wherein the model relates a performance characteristic of the network device to cost parameters associated with different types of traffic; and
  compute, from the model in response to the input traffic profile, the performance characteristic of the network device.

9. The article of claim 8, wherein the traffic profile describes a mixture of different traffic types according to different transport protocols.

10. The article of claim 8, wherein the performance characteristic is at least one selected from among a maximum number of packets that can be processed by the network device in a given time interval, and maximum bytes that can be processed by the network device in the given time interval.

11. The method of claim 2, wherein the cost parameters related by the model to the performance characteristic of the network device comprise a first central processing unit (CPU) utilization for a first transport protocol of the different transport protocols, and a second CPU utilization for a second transport protocol of the different transport protocols.

12. The method of claim 11, wherein the traffic profile specifies respective amounts of traffic for the different transport protocols, wherein the traffic profile specifies a first amount of traffic for the first transport protocol, and a second amount of traffic for the second transport protocol, and wherein the model outputs the performance characteristic of the network device based on the first and second CPU utilizations and the first and second amounts.

13. The method of claim 1,
  wherein converting the traffic information to the traffic profile that describes traffic according to a transport protocol comprises using first indicators and second indicators associated with the plurality of flows, each first indicator of the first indicators to indicate whether or not a respective flow of the plurality of flows has traffic according to a first transport protocol, and each second indicator of the second indicators to indicate whether or not a respective flow of the plurality of flows has traffic according to a second transport protocol.

14. The system of claim 6, wherein the parameters related by the model to the performance characteristic of the network device comprise a first central processing unit (CPU) utilization for a first transport protocol, and a second CPU utilization for a second transport protocol.

15. The system of claim 14, wherein the traffic profile specifies a first amount of traffic for the first transport protocol, and a second amount of traffic for the second transport protocol, and wherein the model outputs the performance characteristic of the network device based on the first and second CPU utilizations and the first and second amounts.

* * * * *